United States Patent [19]
Maat

[11] Patent Number: 4,789,659
[45] Date of Patent: Dec. 6, 1988

[54] CATALYST OF A SINTERED IRON OXIDE-CONTAINING ARTICLE

[75] Inventor: Johan H. H. T. Maat, Stockton-on-Tees, England

[73] Assignee: Imperial Chemical Industries PLC, Millbank, England

[21] Appl. No.: 60,444

[22] Filed: Jun. 11, 1987

Related U.S. Application Data

[63] Continuation-in-part of Ser. No. 924,037, Oct. 28, 1986, Pat. No. 4,729,982.

[30] Foreign Application Priority Data

Jun. 12, 1986 [GB] United Kingdom ............... 8614297
Oct. 24, 1986 [EP] European Pat. Off. ........ 86308277.2
Jan. 26, 1987 [GB] United Kingdom ............... 8701665

[51] Int. Cl.$^4$ .................... B01J 21/04; B01J 21/10; B01J 23/78
[52] U.S. Cl. .................... 502/328; 502/524; 423/363
[58] Field of Search ............... 502/328, 524; 423/363

[56] References Cited

U.S. PATENT DOCUMENTS 3,243,386 3/1966 Nielsen et al. ............... 502/328 X
4,654,320 3/1987 Jennings .................... 502/328
4,668,658 5/1987 Jennings .................... 502/336
4,689,317 8/1987 Jennings .................... 423/363 X

FOREIGN PATENT DOCUMENTS 1470913 4/1977 United Kingdom .
1484864 9/1977 United Kingdom .
2042921 10/1980 United Kingdom .

Primary Examiner—W. J. Shine
Attorney, Agent, or Firm—Cushman, Darby & Cushman

[57] ABSTRACT

The tendency of sintered iron oxide articles, particularly those wherein the iron oxide in the sintered article is in the form of haematite, containing a minor proportion of calcium oxide to cracking on reduction of the iron oxide to iron is increased by the incorporation of a minor amount of magnesium aluminate spinel into the iron oxide composition.

8 Claims, No Drawings

CATALYST OF A SINTERED IRON OXIDE-CONTAINING ARTICLE

This application is a continuation-in-part of Ser. No. 924,037, filed Oct. 28, 1986, now U.S. Pat. No. 4,729,982.

This invention relates to sintered articles and in particular to sintered iron articles and precursors thereto. Sintered iron articles, eg pellets, are employed in the steel industry as a conveniently handleable form of iron and have been proposed as catalysts for hydrogenation reactions, eg ammonia synthesis and nitrile hydrogenation, see for example GB-A-1484864.

The shaped iron articles are normally made by the reduction of precursors in the form of sintered iron oxide-containing articles formed from a finely divided iron oxide composition. In order to assist densification of the sintered precursor and/or, where the sintered iron article is to be used as a catalyst, to promote catalytic activity, minor proportions of oxidic materials that are not readily reducible, or compounds that decompose to such oxidic materials on heating, are often incorporated into the composition. Among such common additives are alumina, magnesia, calcium oxide, and alkali metal oxides, or compounds decomposable to such oxidic materials. For example, for use as an ammonia synthesis catalyst precursor, the sintered iron oxide composition will typically contain 1 to 5% w/w alumina, 0.3 to 2% w/w alkali metal, particularly potassium, oxide, up to 5% w/w calcium oxide and/or up to 2% w/w magnesia. The iron oxide composition may also contain reducible oxides, eg oxides of metals such as cobalt, typically in proportions of up to 40% w/w. For nitrile hydrogenation catalyst precursors, the iron oxide composition will typically contain 0.5 to 5% w/w of alumina, magnesia, and/or calcium oxide, but will generally not contain an alkali metal oxide. For non-catalytic applications calcium oxide is often incorporated as a flux.

Like fused products, sintered iron oxide articles have a low surface area and a high density. However sintered products can readily be distinguished from fused products by optical and/or scanning electron microscopy since sintered products have a morphology that is quite different from that of fused products. In particular the sintered products show a significant proportion of vestiges of the finely divided particles used in the manufacture of the sintered product, although many of the fine particles will have agglomerated. Sintered iron oxide articles can also be distinguished from fused products by measurement of the pore volume distribution. Thus the sintered products generally exhibit a porosity of at least 0.01, particularly at least 0.02, cm$^3$ per g of sintered product in the form of pores of radius below 10 $\mu$m. In contrast, fused products show negligible pore volume, generally totalling less than 0.005 cm$^3$.g$^{-1}$ in the form of pores of radius below 10 $\mu$m. The pore volume distribution may be determined by mercury porosimetry at varying pressures.

The sintered products also exhibit a distinctly different pore volume distribution from that of fused materials when the pore volume is determined after reduction of the iron oxide to iron. In this case both the sintered and fused products, after reduction, have an appreciable porosity in the form of pores of radius in the range 100 to 1000 Å (0.01 to 0.1 $\mu$m) as a result of the pores formed by reduction of the iron oxide to iron. However, whereas the reduced fused articles exhibit only a small amount of porosity, less than about 0.015 cm$^3$.g$^{-1}$, in the form of pores of radius between 0.1 and 10 $\mu$m, the sintered products, after reduction, generally exhibit a porosity of at least 0.02 cm$^3$.g$^{-1}$ in the form of pores of radius between 0.1 and 10 $\mu$m.

The sintered iron oxide composition preferably contains at least 50% by weight of iron oxide (expressed as Fe$_2$O$_3$) and the combined weights of iron oxide (expressed as Fe$_2$O$_3$) and any cobalt oxide (expressed as CoO) present, is preferably at least 70%, particularly at least 85%, by weight of the composition.

The iron oxide used to make the sintered article may be magnetite or haematite. However, if the sintering is conducted in an oxidizing atmosphere, eg air, as is usual, the iron oxide in the sintered article will be in the form of haematite unless very high sintering temperatures, above 1370° C., are employed. Sintered iron oxide articles wherein the iron oxide is in the form of magnetite can only be obtained if the sintering is effected under a carefully controlled non-oxidizing atmosphere at sintering temperatures below about 1300° C., or if the sintering is conducted at a temperature above the temperature, 1370° C., at which haematite is converted to magnetite.

As mentioned above, the compositions often desirably contain calcium oxide. One disadvantage of the incorporation of calcium oxide into the composition where the iron oxide of the sintered article is haematite is that, on reduction of the haematite to metallic iron, there is a tendency, possibly as a result of reduction of calcium ferrite formed during the sintering step, of the sintered article to crack and weaken and in some cases disintegrate. This cracking problem does not appear to arise where the iron oxide in the sintered article is in the form of magnetite, unless the calcium oxide levels are very high. This is believed to be because the calcium oxide dissolves into the magnetite crystal lattice and, only at high levels of calcium oxide, is a separate calcium ferrite phase formed.

We have found that the incorporation of small amounts of magnesium aluminate spinel into the iron oxide composition gives a marked decrease in this tendency to cracking.

Accordingly the present invention provides a sintered iron oxide-containing article containing a minor proportion of calcium oxide, characterised in that the composition also contains a minor proportion of magnesium aluminate spinel.

The present invention also provides sintered iron articles obtained by the reduction of such a sintered iron oxide-containing article.

It has been found that it is necessary that the magnesium aluminate spinel is added as such to the composition from which the sintered iron oxide-containing article is made. Thus the addition of magnesia and alumina as separate components does not have the desired effect. Of course the composition can also contain alumina and/or magnesia in addition to the spinel.

The amount of magnesium aluminate spinel that is required is relatively small: generally 0.1 to 1 mole of the spinel per mole of calcium oxide is sufficient.

The sintered iron oxide-containing articles may be made by forming a finely divided particulate composition containing iron oxide, eg haematite or magnetite, particles, together with the other ingredients, including the magnesium aluminate spinel and calcium oxide, or a calcium compound decomposable thereto upon heating, forming the finely divided composition into the desired shape and then heating the composition to convert, if necessary, metal compounds to the oxide form and to cause the particles to sinter together.

It is preferred that essentially all of the particles in the composition have a size below 50 μm, particularly below 20 μm. In particular, it is preferred that at least 50%, preferably at least 90%, by weight of the particles have a size below 10 μm.

The shaping process may be conducted wet or dry. Where a complex shape is required it may be formed by techniques such as isostatic moulding. Where the desired shape is of a pellet nature, the particulate composition may be compacted to a sheet or ribbon by passage through contra-rotating rolls: the compacted sheet or ribbon can then be broken into the form of pellets characterised by two mutually opposed faces formed by compression in contact with a surface and having other faces formed by fracture. Instead of forming a sheet or ribbon by compaction, individual pellets, which may be elongated, for example cigar shaped, may be formed by roll compaction using suitably profiled rolls. For roll compaction a binder such as a starch or stearates of a metal such as aluminium or magnesium, typically in quantities in the range 0.5 to 3% by weight of the particulate composition, may be added to assist formation of coherent compacts. Particularly where the binder is a starch, some water may be included.

Alternatively, and preferably where a pellet form is desired, the particulate composition is shaped by a wet extrusion process wherein one or more organic polymeric binders and a liquid such as water or an alcohol is added to the particulate composition prior to extrusion. Where the liquid is water, the binder is preferably a hydrophilic polymer that is self adhesive, eg a solubilized starch, particularly in admixture with a shear thinning hydrophilic polymer, eg corn starch or a polyvinyl alcohol. The use of such binders for wet extrusion of oxidic materials is described in EP-A-No.134138. The extrusion is conveniently conducted at ambient temperature by forcing the composition through a suitable die. One advantage of the use of an extrusion process is that, by the use of an extrusion die having appropriate cores, it is possible to produce shaped articles of uniform cross section having longitudinal passages extending therethrough. Articles having a plurality of through passages are advantageous when it is desired to produce products having a high geometric surface area per unit volume of a bed of the articles. The invention is of particular merit in producing articles with a large number of small cross section through passages per cm² of the article cross section. The production of such articles is described in EP-A-No.222541, EP-A-No.222542, and EP-A-No.223439.

After extrusion the extruded product is cut into the desired lengths after, or preferably before, sintering. The cutting technique employed should of course be such that any through passages do not become blocked in the cutting process. A suitable cutting technique is described in EP-A-No.223445. Alternatively the articles may be made by tabletting techniques. In this case the walls of the tabletting die and/or any cores may have a slight taper, for example up to 3°, to assist in release of the units from the die. Alternatively a granulating technique, for example as widely used in the steel industry, may be employed.

After shaping, and, where the shaping process is by extrusion, preferably after cutting the extrudate to the desired length, the article is dried, if necessary, and then, where a binder having an organic component is employed in the shaping step, the organic component is burnt out in a calcination step, preferably at 250 to 500° C., in an oxygen containing gas, eg air. Such a calcination step may also be advantageous even where no organic binder is employed. The article is then sintered at a temperature preferably above 1100° C., in particular above 1200° C. Preferably the sintering temperature is below 1350° C. The sintering is preferably conducted at such a temperature that no significant conversion of haematite to magnetite occurs.

Where the sintered iron oxide-containing article also contains an alkali metal compound, such compounds, or compounds decomposable thereto during the calcination or sintering steps, may be incorporated as a powder or by impregnating the particulate iron oxide-containing composition before or after shaping, but preferably before calcining and sintering, with an aqueous solution containing the desired alkali metal compound, or a compound decomposable thereto.

Reduction of the sintered iron oxide article to an iron article is conveniently conducted by passing a current of a reducing gas such as hydrogen and/or carbon monoxide over the sintered iron oxide articles at a temperature in the range 300 to 1200° C. If the iron article is to be used as a catalyst, the temperature for the reduction is preferably below 500° C. and the reducing gas is preferably hydrogen, or may in some cases be the process gas, eg ammonia synthesis gas, employed in the catalytic reaction and the reduction may be effected in the reactor in which the catalytic reaction is to take place. Precautions should be taken to avoid back diffusion of water vapour into contact with the iron formed by the reduction and to prevent overheating once the iron oxide has been reduced. Alternatively the precursor can be reduced outside the reactor in which it is to be used and passivated by cool oxygen, diluted with an inert gas, eg nitrogen, which can then be fully reduced after charging to the reaction vessel. The reduction of the iron oxide to iron is preferably effected at a pressure in the range 1 to 300, particularly 20 to 120, bar abs.

The sintered iron articles are of particular utility as ammonia synthesis catalysts, particularly when operating the ammonia synthesis under the following conditions: temperature 300 to 500° C., preferably 350 to 430° C., pressure 20 to 250, preferably 40 to 120, bar abs., using a hydrogen/nitrogen mixture containing up to 3.1, especially 2.5 to or, as described in U.S. Pat. No. A-4383982, 1.5 to 2.3, moles of hydrogen per mole of nitrogen.

The invention is illustrated by the following examples.

EXAMPLE 1

Haematite was milled to a fine powder, having a median particle size of 3 μm, all the particles having a size below 10 μm.

958 parts by weight of the milled haematite powder was then mixed with 31 parts by weight of alumina trihydrate, and 11 parts by weight of calcium carbonate, both of which had been previously ground to a similar degree of fineness as the haematite.

To this mixture was then added 10 parts by weight of a high molecular weight polysaccharide, ("Zusoplast PS 1", available from Zschimmer und Schwarz, Lahnstein am Rhein, FRG), 40 parts by weight of corn starch ("Kordek", grade G08010 available from CPC UK Ltd, Industrial Division, Trafford Park, Manchester, UK) and about 130 parts by weight of an aqueous solution containing 96 g.l$^{-1}$ of potassium carbonate, and mixed into the form of a homogeneous paste.

The mixture was then extruded at room temperature through a circular die having 13 wires of 0.7 mm diameter suspended as cores. The cylindrical extrudates, having 13 holes extending longitudinally through, was cut into lengths, dried at 30° C. for 12 hours under a humidity controlled atmosphere, and then heated to 400° C. at a rate of 200° C. per hour, and held at 400° C. until the organic components were fully burnt out. The shaped articles were then sintered at 1300° C. in an air atmosphere for 4 hours, and then cooled to ambient over 6 hours.

The sintered shaped articles, which were cylinders of length 6.5 mm and diameter 6.5 mm with 13 holes of diameter 0.6 mm extending therethrough, had a particle density, as determined by reference to their volume in mercury at atmospheric pressure, of 4.2 g.cm$^{-3}$, and a porosity of 0.043 cm$^3$.g$^{-1}$.

Chemical analysis showed that the sintered units had the following composition, expressed as percentage by weight:

Fe$_2$O$_3$: 96.9%
CaO: 0.6%
Al$_2$O$_3$: 2.0%
K$_2$O: 0.5%

The above procedure was repeated using iron oxide compositions to which varying proportions of magnesium aluminate spinel, that had been ground to a similar degree of fineness as the haematite, had been added prior to formation of the paste.

In order to assess the reduction characteristics of the sintered iron oxide articles, a number thereof were charged to a cylindrical reactor of 27.5 mm diameter and 70 mm length to form a randomly packed bed of volume about 40 ml.

In a first set of experiments, A, while passing a mixture of hydrogen and nitrogen containing 75% v/v of hydrogen through the bed at a rate of 250 litres.h$^{-1}$, the temperature was raised to 350° C. over a period of 3 hours and then further increased to 475° C. over a period of 8 hours.

In a second set of experiments, B, the bed was heated to 475° C. while passing nitrogen through the bed at a rate of 250 litres.h$^{-1}$ and then the nitrogen stream was replaced by the hydrogen/nitrogen mixture containing 75% v/v hydrogen and maintained at that temperature until the iron oxide was fully reduced to iron.

In both sets of experiments, after cooling to room temperature under the hydrogen/nitrogen mixture, the hydrogen/nitrogen mixture was replaced with nitrogen flowing at a rate of 200 litres.h$^{-1}$ and then, over a period of 30 minutes, the nitrogen was gradually replaced by air. The shaped articles were then examined. The results are shown in the following table.

By way of comparison, compositions were also made in which the magnesium aluminate spinel was replaced by magnesia.

| Composition | | Reduction | |
|---|---|---|---|
| Additive | % w/w* | procedure | Comments |
| none | — | A | Fragmented, partially pulverised |
| spinel | 0.25 | A | Intact, slightly dusty |
| spinel | 0.5 | A | Intact, slightly dusty |

| Composition | | Reduction | |
|---|---|---|---|
| Additive | % w/w* | procedure | Comments |
| spinel | 0.75 | A | Intact, slightly dusty |
| spinel | 1.0 | A | Intact, slightly dusty |
| spinel | 1.0 | B | Little fragmentation and dust |
| magnesia | 1.0 | B | Fragmented, little dust |

*percent cent by weight of the haematite/alumina/lime mixture.

When the reduction procedure A was performed on units made from a composition from which the lime had been omitted, the shaped articles were intact. However the disadvantage of the omission of lime is that the catalytic properties of the catalysts were adversely affected and also that the sintering temperature required to achieve a desired density of the sintered article is increased.

EXAMPLE 2

Extrudates were made by the procedure of Example 1 using a composition containing 1% w/w magnesium aluminate spinel and using an extrusion die having 50 wire cores arranged in concentric rings of 29, 14, and 6 cores, around a central core. The die and cores were dimensioned such that, after sintering, the extruded articles had a length and diameter of 8.5 mm and through passages of diameter about 0.48 mm. The particle density was 4.0 g.cm$^{-3}$.

The chemical composition, by weight, of the articles was as follows:

Fe$_2$O$_3$: 96.4%
Al$_2$O$_3$: 2.3%
CaO: 0.6%
MgO: 0.3%
K$_2$O: 0.4%

An adiabatic reactor was used to assess the activity of catalysts made by reduction of the shaped articles. The shaped articles were charged to a catalyst bed of 23.7 liters volume filling an annular space of outer diameter 203 mm and inner diameter 8 mm and length 1015 mm. The shaped articles were reduced at 80 bar abs pressure with a gas mixture containing hydrogen and nitrogen in the molar ratio 2.35 at a flow rate of 300 m$^3$.h$^{-1}$ (at STP). The gas inlet temperature was initially 350° C. and was gradually increased until the reduction was complete as evidenced by cessation of the formation of water vapour. The rate of increase of the temperature was controlled to maintain the water concentration below 2000 ppm by volume. When reduction was complete, the inlet temperature was reduced to 350° C. and, after steady state conditions had been established, the ammonia concentration of the gas leaving the bed was 8.3% v/v and the increase in temperature across the bed was 95° C.

After passivation as described previously, the discharged catalyst pellets were intact.

I claim:

1. A sintered iron oxide-containing article having a density in the range 4.0 to 4.2 g.cm$^{-3}$ and containing at least 50% by weight of iron oxide (expressed as Fe$_2$O$_3$) and optionally cobalt oxide (expressed as CoO), the total of iron oxide and cobalt oxide being at least 85% by weight of the article, and a minor proportion of calcium oxide, said article also containing a minor proportion of magnesium aluminate spinel such that any tendency of the article to crack on reduction of the iron oxide to iron in the absence of the spinel is reduced by the spinel.

2. A sintered article according to claim 1 which contains 0.1 to 1 mole of magnesium aluminate spinel per mole of calcium oxide.

3. A sintered article according to claim 1 which contains up to 5% by weight of calcium oxide.

4. A sintered article according to claim 1 which contains alumina and/or magnesia in addition to the magnesium aluminate spinel.

5. A method of making a sintered iron oxide-containing article comprising forming a finely divided particulate composition containing iron oxide and a minor proportion of calcium oxide, or a calcium compound decomposable thereto upon heating, and magnesium aluminate into a shaped article, and sintering the composition at a temperature above 1100° C.

6. A method of making a sintered iron article comprising forming a finely divided particulate composition containing iron oxide and a minor proportion of calcium oxide, or a calcium compound decomposable thereto upon heating, and magnesium aluminate into a shaped article, sintering the composition at a temperature above 1100° C. to form a sintered iron oxide-containing article and then reducing the iron oxide in said sintered iron oxide-containing article to metallic iron.

7. A method according to claim 6 wherein the reduction is effected by passing a current of a reducing gas over the sintered iron oxide-containing article at a temperature in the range 300 to 1200° C.

8. A sintered iron oxide-containing article containing at least 50% by weight of iron oxide (expressed as $Fe_2O_3$) and optionally cobalt oxide (expressed as CoO), the total of iron oxide and cobalt oxide being at least 85% by weight of the article, and a minor proportion of calcium oxide, said article having been made by sintering at a temperature above 1100° C., and said article also containing a minor proportion of magnesium aluminate spinel such that any tendency of the article of crack on reduction of the iron oxide to iron in the absence of the spinel is reduced by the spinel.

* * * * *